United States Patent
Wang et al.

(10) Patent No.: US 12,386,224 B1
(45) Date of Patent: Aug. 12, 2025

(54) CHOLESTERIC LIQUID CRYSTAL POLARIZING GRATING

(71) Applicant: NATIONAL SUN YAT-SEN UNIVERSITY, Kaohsiung (TW)

(72) Inventors: Chun-Ta Wang, Kaohsiung (TW); Tsung-Hsien Lin, Kaohsiung (TW); Yu-Chieh Li, Kaohsiung (TW); Cheng-Kuan Wu, Kaohsiung (TW); Cheng-Chang Li, Kaohsiung (TW); Li-Min Chang, Kaohsiung (TW); Duan-Yi Guo, Kaohsiung (TW); Kuan-Wu Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 18/804,162

(22) Filed: Aug. 14, 2024

(30) Foreign Application Priority Data

Jun. 11, 2024  (TW) ................................ 113121498

(51) Int. Cl.
*G02F 1/1337* (2006.01)
*G02F 1/137* (2006.01)

(52) U.S. Cl.
CPC ........ *G02F 1/1337* (2013.01); *G02F 1/13712* (2021.01)

(58) Field of Classification Search
CPC ............................ G02F 1/1337; G02F 1/13712
See application file for complete search history.

(56) References Cited

U.S. PATENT DOCUMENTS

2024/0085742 A1\* 3/2024 Li ............................ G02F 1/29

FOREIGN PATENT DOCUMENTS

CN         118759770 A  \* 10/2024  ......... C09K 19/3842
WO    WO-2024146858 A1 \*  7/2024  ............. C09K 19/52

OTHER PUBLICATIONS

English Machine Translation of Zhang et al.CN 118759770 (Year: 2025).\*
English Machine Translation Of Li et al.(WO 2024/146858 (Year: 2025).\*

\* cited by examiner

*Primary Examiner* — Donald L Raleigh
(74) *Attorney, Agent, or Firm* — WPAT, PC

(57) ABSTRACT

A cholesteric liquid crystal polarizing grating includes two substrates, two alignment layers, and a liquid crystal layer. An interlayer space is formed between the two substrates. The two alignment layers are respectively located on inner surfaces of the two substrates facing the interlayer space. Alignment directions of the alignment layers are periodically arranged. An alignment plane of each alignment layer is divided into a plurality of rows. The alignment directions in a same row are the same, and the alignment directions in adjacent rows rotate relative to each other. The plurality of rows with the alignment directions rotated by 180 degrees defines a grating period. The liquid crystal layer is located in the interlayer space. Liquid crystal molecules adjacent to the two alignment layers are arranged following the alignment direction of each alignment layer to form a polarizing grating with the grating period.

10 Claims, 5 Drawing Sheets

CHOLESTERIC LIQUID CRYSTAL POLARIZING GRATING

CROSS REFERENCE TO RELATED APPLICATION

The application claims the benefit of Taiwan application serial No. 113121498, filed on Jun. 11, 2024, and the entire contents of which are incorporated herein by reference.

BACKGROUND OF THE INVENTION

1. Field of the Invention

The present invention relates to an optical element and, more particularly, to a cholesteric liquid crystal polarizing grating which has a fast response to control the optical characteristics in real time.

2. Description of the Related Art

Liquid crystals may be classified into smectic liquid crystal, nematic liquid crystal, and cholesteric liquid crystal based on the structure of molecular arrangement. The cholesteric liquid crystal has a helical structure with periodically distributed refractive index. A distance required for rotating a liquid crystal direction by 360 degrees is defined as a pitch. An optical characteristic varies with the pitch and the helical axis arrangement. The pitch of the cholesteric liquid crystal may be changed through adjustment of material composition of the liquid crystal.

When an electric field is applied to the cholesteric liquid crystal, although the reflection intensity of the cholesteric liquid crystal can be changed, Helfrich deformation occurs, resulting in a shift in a reflection waveband. The Helfrich deformation is considered to be caused by dielectric instability and dielectric anisotropy of the liquid crystal. When the Helfrich deformation occurs, the pitch of the cholesteric liquid crystals twists, which equivalently reduces a reflection wavelength, and results in a chaotic arrangement of the cholesteric liquid crystals. Thus, a planar distribution of the cholesteric liquid crystals having different spatial orientations is eliminated. In addition, controlling the cholesteric liquid crystals gives rise to branch structures resulting in complicated manufacturing process. In addition, existing cholesteric liquid crystal elements have a response time of a few seconds to minutes, and thus have limited application scope due to the response speed.

In view of this, it is necessary to improve the known cholesteric liquid crystal element.

SUMMARY OF THE INVENTION

To solve the above problems, it is an objective of the present invention to provide a cholesteric liquid crystal polarizing grating, which can improve arrangement stability and optical performance of liquid crystals on a plane.

It is another objective of the present invention to provide a cholesteric liquid crystal polarizing grating, which can reduce the time required for adjusting color or optical characteristic.

It is yet another objective of the present invention to provide a cholesteric liquid crystal polarizing grating, which can simplify the manufacturing process, thereby reducing manufacturing costs.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

A cholesteric liquid crystal polarizing grating according to the present invention includes two substrates, two alignment layers, and a liquid crystal layer. The two substrates are arranged opposite to each other. An interlayer space is formed between the two substrates, and the two substrates are electrically connected to a voltage source to form an electric field between the two substrates. The two alignment layers are respectively located on inner surfaces of the two substrates facing the interlayer space. Alignment directions of the two alignment layers are periodically arranged. An alignment plane of each of the two alignment layers is divided into a plurality of rows parallel to each other. The alignment directions in a same row are the same, and the alignment directions in adjacent rows rotate relative to each other. The plurality of rows with the alignment directions rotated by 180 degrees defines a grating period. The liquid crystal layer is located in the interlayer space. The liquid crystal layer includes negative nematic liquid crystal molecules, chiral molecules, and salt ions. The negative nematic liquid crystal molecules adjacent to the two alignment layers are arranged following the alignment direction of each of the two alignment layers, forming a periodically arranged polarizing grating with the grating period.

According to the cholesteric liquid crystal polarizing grating of the present invention, a reflective polarizing grating is formed by using the negative nematic liquid crystal molecules doped with the chiral molecules and the salt ions, in combination with the alignment layers having the periodically arranged alignment directions. When an alternating current electric field is applied, Helfrich deformation occurs in the negative cholesteric liquid crystal, so that a blue shift occurs in the reflection waveband, thereby achieving control of the reflection wavelength through an electric field change. Furthermore, even if the Helfrich deformation occurs in a middle portion of the liquid crystal layer, through an anchoring force provided by the alignment layer, the liquid crystal molecules adjacent to the alignment layer can still provide different pointing directions to reflect incident light, thereby maintaining a reflective polarizing function. In addition, a response time of the cholesteric liquid crystal polarizing grating of the present invention is in a microsecond level, thereby achieving fast dynamic adjustment. Thus, the cholesteric liquid crystal polarizing grating is applicable to devices that require real-time optical characteristic adjustments, such as a virtual reality or augmented reality device, a smart window, a safety label, or an optical filter.

In an example, the grating period is between 200 nanometers and 40 micrometers. Thus, the grating period may be used for calculating a light modulation result, achieving control of the reflected light.

In an example, the salt ions include at least one selected from a group consisting of sodium chloride, calcium sulfate, sodium carbonate, sodium bicarbonate, potassium nitrate, tetrabutylammonium bromide, tetrabutylammonium hydrogen sulfate, tetrabutylammonium chloride, tetrabutylammonium hexafluorophosphate, and tetrabutylammonium tetrafluoroborate (TBATFB). Thus, the liquid crystal layer can generate the Helfrich deformation, thereby controlling a wavelength of light reflected by a liquid crystal component, thereby reflecting light of different colors.

In an example, a thickness of the liquid crystal layer is between 3 μm and 20 μm. Thus, the thickness, together with the pitch range, provide the negative cholesteric liquid crystal with sufficient layers, thereby achieving a sufficient reflectance of the negative cholesteric liquid crystal.

In an example, a reflection waveband of the liquid crystal layer is between 400 nm and 700 nm. Thus, the liquid crystal layer can reflect visible light, thereby modulating visible light.

In an example, a pitch of the liquid crystal layer is between 300 nm and 500 nm. Thus, the pitch enables the reflection waveband to be in a visible light waveband, thereby modulating visible light.

In an example, a birefringence range of the liquid crystal layer is greater than 0.1. Thus, significant reflectance sacrifice of liquid crystals caused by an excessively low birefringence is avoided during color change.

In an example, the alignment direction of each of the two alignment layers is oriented through exposure and/or a groove. Thus, the liquid crystal molecules adjacent to the alignment layers are arranged periodically, thereby forming the polarizing grating.

In an example, a concentration of the salt ions is between 0.01% and 0.4%. The concentration range is selected since an ion concentration above 0.010% can form a disturbance to change colors and an ion concentration of 0.4% reaches substantial saturation. Thus, a voltage magnitude can be optimized through adjustment of the concentration of the salt ions, thereby reducing an operating voltage.

In an example, each of the two substrates includes a conductive film disposed between the inner surface of each of the two substrates facing the interlayer space and the respective alignment layer. A material of the conductive film includes at least one selected from a group consisting of indium tin oxide (ITO), a nano silver wire, and nano metal particles. A material of each of the two substrates includes at least one selected from a group consisting of glass, acrylic, and plastic. Thus, a proportion of incident light absorbed by the substrate can be reduced, providing a transparent substrate.

A method for driving a cholesteric liquid crystal polarizing grating according to the present invention adopts the above cholesteric liquid crystal polarizing grating. The driving method includes the following step: applying an alternating current voltage to the cholesteric liquid crystal polarizing grating to form an electric field between the two substrates, so that the pitch of the liquid crystal layer changes, thereby changing the reflection waveband of the polarizing grating.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
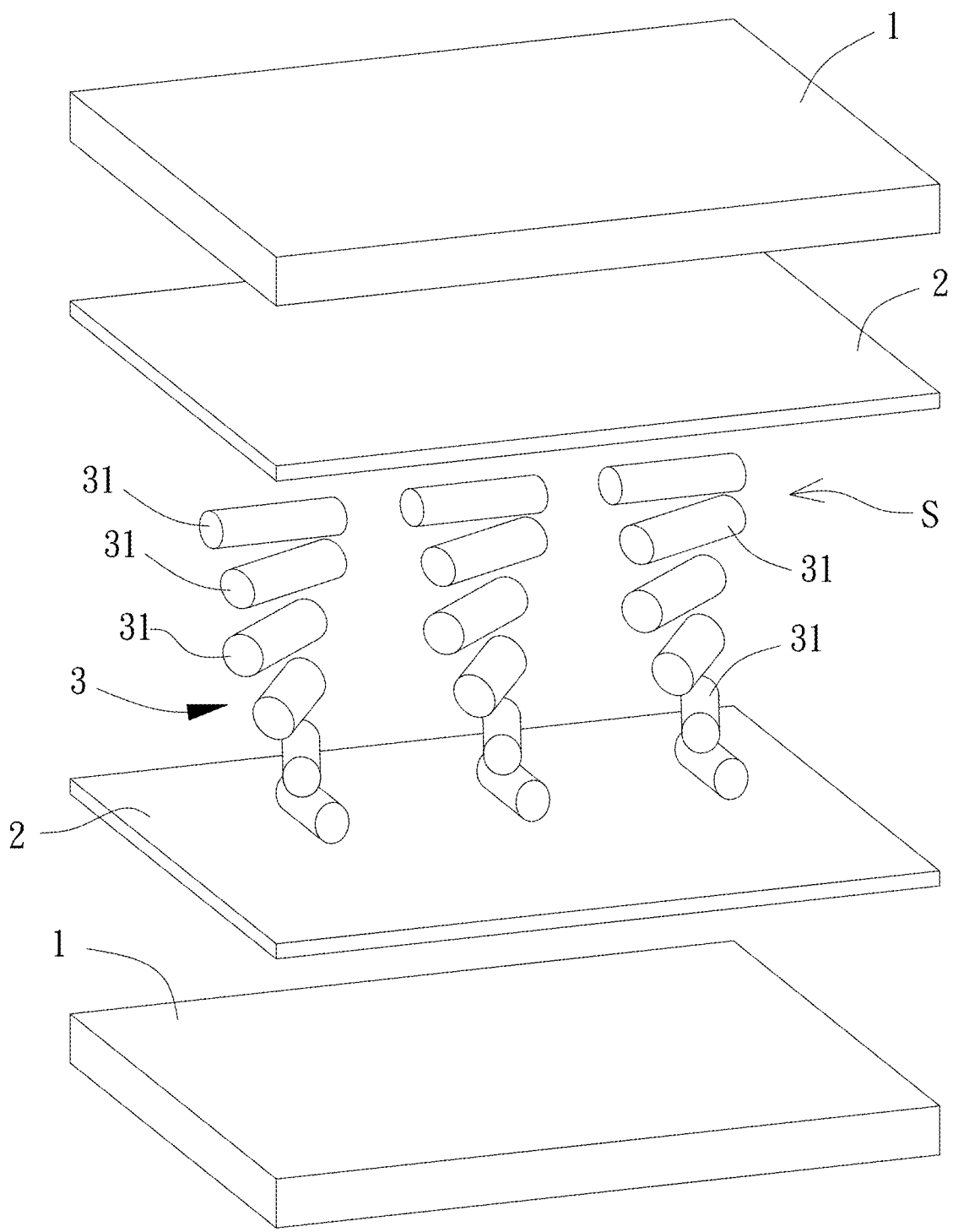
FIG. 1 is an exploded perspective view of the first embodiment according to the present invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Figure 2:
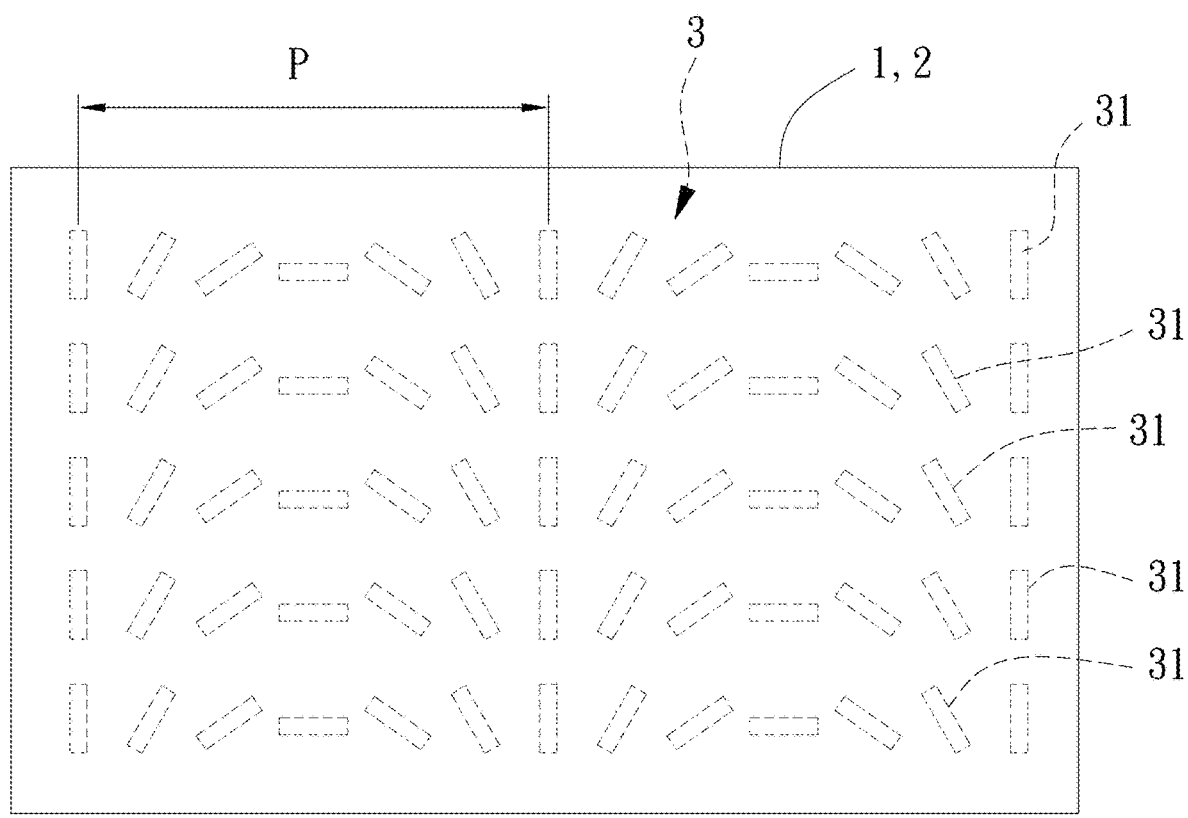
FIG. 2 is a front view of the structure of the polarizing grating according to the present invention.

FIGS. 1 and 2 show the first embodiment of a cholesteric liquid crystal polarizing grating according to the present invention. The cholesteric liquid crystal polarizing grating includes two substrates 1, two alignment layers 2, and a liquid crystal layer 3.

The two substrates 1 are arranged opposite each other. An interlayer space S formed between the two substrates, and the two substrates are electrically connected to a voltage source (not shown), so that the voltage source forms an electric field between the two substrates 1. In this embodiment, the voltage source applies an alternating current voltage to the two substrates 1, forming an alternating current electric field between the two substrates 1. The two substrates 1 are transparent substrates, and are preferably made of conductive, transparent, and non-breathable materials. In some embodiments, each substrate 1 may include a conductive film. The conductive film is disposed between an inner surface of each substrate 1 facing the interlayer space S and each alignment layer 2. Each substrate 1 may be made of a material including but not limited to glass, acrylic, and plastic (for example, polyethylene terephthalate (PET), polycarbonate (PC), or polyimide (PI)). The conductive film may be made of a transparent conductive metal material including but not limited to indium tin oxide (ITO), a nano silver wire, and nano metal particles.

The two alignment layers 2 are respectively located on inner surfaces of the two substrates 1 facing the interlayer space S. Alignment directions of the alignment layers 2 are periodically arranged. As shown in FIG. 2, an alignment plane of each alignment layer 2 is divided into a plurality of rows parallel to each other. The alignment directions in a same row are the same, and the alignment directions in adjacent rows rotate relative to each other. A plurality of rows among which the alignment directions are rotated by 180 degrees defines a grating period P.

The liquid crystal layer 3 is located between the two substrates 1 and in the interlayer space S. The liquid crystal layer 3 includes a plurality of negative nematic liquid crystal molecules 31, chiral molecules, and salt ions. In some embodiments, a thickness of the liquid crystal layer 3 is between 3 μm and 20 μm. Optionally, the thickness of the liquid crystal layer 3 is between 5 μm and 15 μm.

A birefringence range of the liquid crystal layer 3 is greater than 0.1. The chiral molecules are doped in the plurality of negative nematic liquid crystal molecules 31. In some embodiments, a reflection waveband of the liquid crystal layer 3 is between 400 nm and 700 nm. Optionally, the reflection waveband of the liquid crystal layer 3 is between 500 nm and 600 nm. Optionally, the reflection waveband of the liquid crystal layer 3 may be 400 nm, 450 nm, 500 nm, 550 nm, 600 nm, 650 nm, or 700 nm. A pitch of the liquid crystal layer 3 is between 300 nm and 500 nm. Optionally, the pitch of the liquid crystal layer 3 may be 300 nm, 350 nm, 400 nm, 450 nm, or 500 nm.

The salt ions are doped in the plurality of negative nematic liquid crystal molecules 31. The salt ions may be a material that is soluble in water and can be decomposed into positive ions and negative ions. In some embodiments, the salt ions may include at least one selected from a group consisting of sodium chloride, calcium sulfate, sodium carbonate, sodium bicarbonate, potassium nitrate, tetrabutylammonium bromide, tetrabutylammonium hydrogen sulfate, tetrabutylammonium chloride, tetrabutylammonium hexafluorophosphate, and tetrabutylammonium tetrafluoroborate (TBATFB), and a concentration of the salt ions is between 0.01% and 0.4%. Optionally, the concentration of the salt ions is between 0.05% to 0.2%. Optionally, the concentration of the salt ions may be 0.02%, 0.04%, 0.06%, 0.08%, 0.1%, 0.15%, 0.2%, 0.25%, 0.3%, or 0.35%.

The plurality of negative nematic liquid crystal molecules 31 adjacent to the alignment layers 2 is arranged according to the alignment direction of each alignment layer. As shown in FIG. 2, arrangement directions of the plurality of negative nematic liquid crystal molecules 31 in a same row are the same, and arrangement directions in adjacent rows rotate relative to each other. In addition, since the arrangement directions of the liquid crystal molecules are polarizing directions through which light passes, a periodically arranged polarizing grating can be formed with the grating period P. In some embodiments, each alignment direction may be oriented through exposure and/or a groove. The grating period P is between 200 nm and 40 μm. For example, the grating period is 1 μm, 4 μm, 5 μm, 10 μm, 15 μm, 20 μm, 25 μm, 30 μm, 35 μm, or 40 μm.

In the first embodiment, the thickness of the liquid crystal layer 3 is 12 μm, the pitch is 400 nm, and the grating period P is 4 μm. The negative nematic liquid crystal molecules are selected from HNG707700-100, the chiral molecules are selected from R811, and the salt ions are selected from TBATFB (0.35%). The light reflected by the liquid crystal layer 3 has a wavelength range of red light, and the wavelength range shifts toward a green light reflection wavelength.

The present invention further provides the second embodiment. The second embodiment is substantially the same as the first embodiment. In this embodiment, the pitch is 360 nm, so that light reflected by the liquid crystal layer 3 has a wavelength range of green light, and the wavelength range shifts toward a blue light reflection wavelength.

Figure 3:
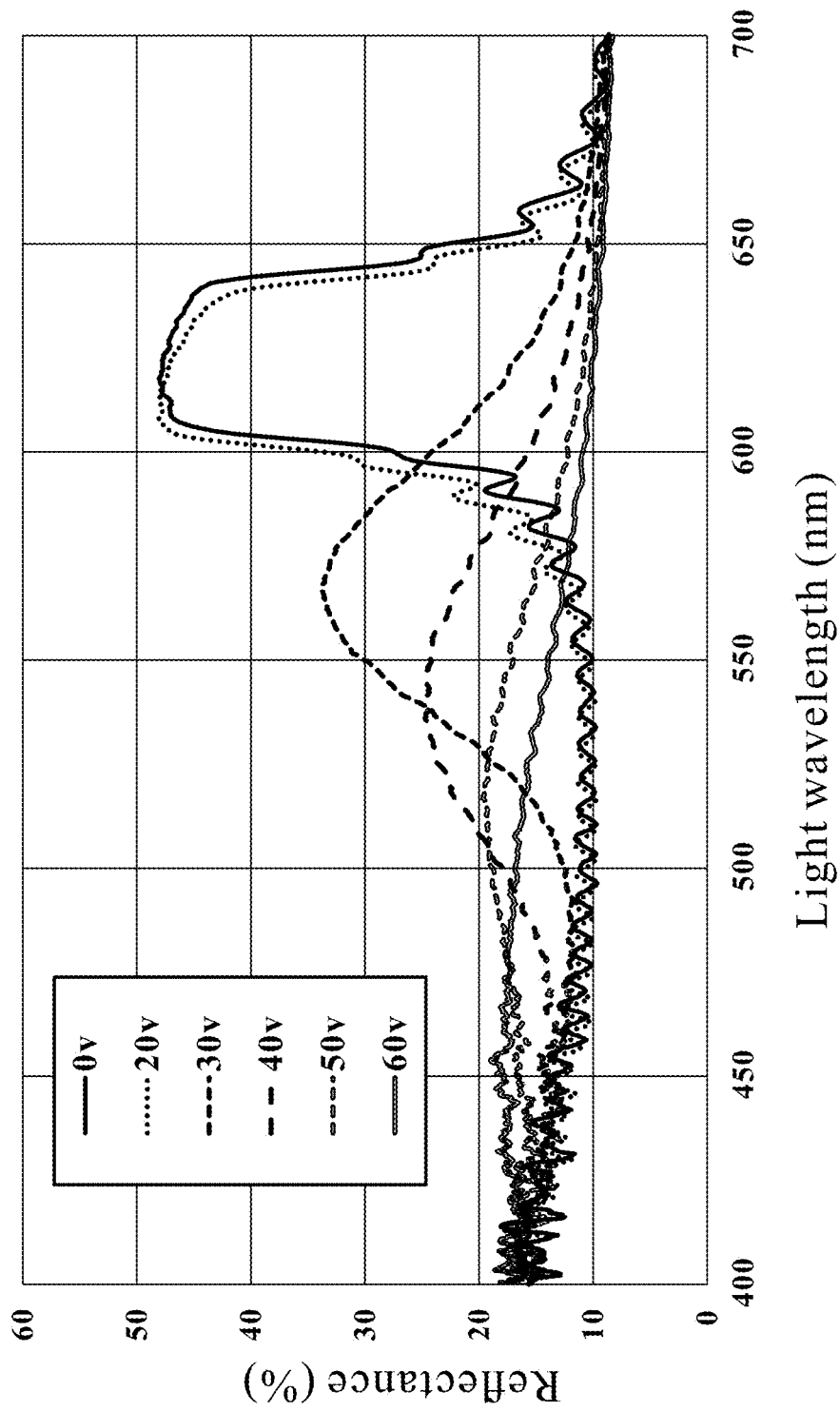
FIG. 3 is a reflection spectrum of the first embodiment at different voltages according to the present invention.
Figure 4:
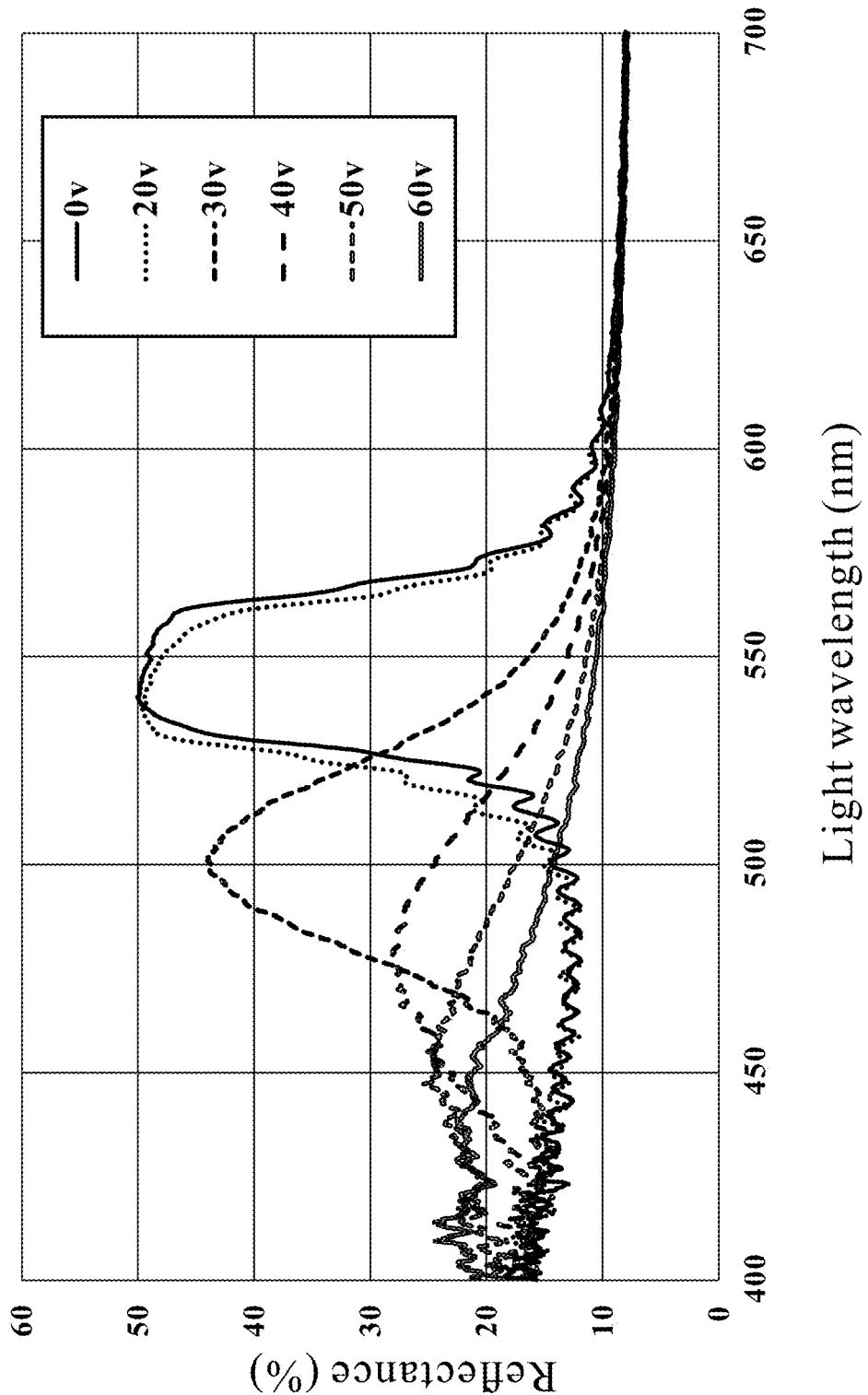
FIG. 4 is a reflection spectrum of the second embodiment at different voltages according to the present invention.
Figure 5:
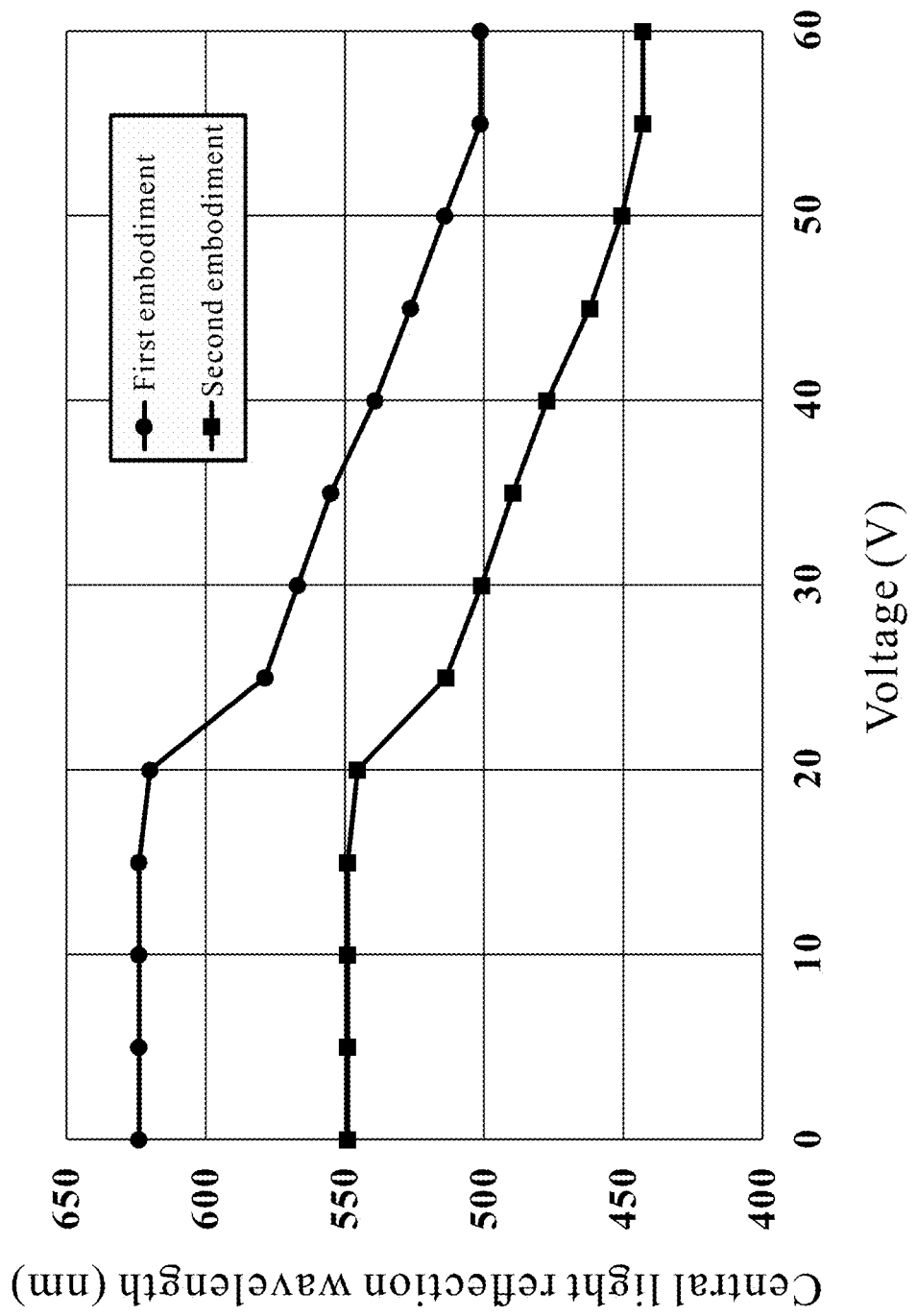
FIG. 5 is a schematic chart showing the relationships between a central reflection wavelength and a voltage of the first and the second embodiments according to the present invention.

Referring to FIGS. 3 to 5, reflectances of the cholesteric liquid crystal polarizing gratings in the first and the second embodiments are measured by using a reflective integrating sphere, and changes in the light reflectances in a wavelength range of 400 nm to 700 nm at different applied voltages are recorded. FIG. 3 shows a spectrum of a light reflectance of the cholesteric liquid crystal polarizing grating of the first embodiment. At an applied voltage of 0 V, a central light reflection wavelength is 620 nm, and at an applied voltage of 30 V, the central light reflection wavelength shifts to 560 nm. FIG. 4 shows a spectrum of a light reflectance of the cholesteric liquid crystal polarizing grating of the second embodiment. At an applied voltage of 0 V, a central light reflection wavelength is 550 nm, and at an applied voltage of 30 V, the central light reflection wavelength shifts to 500 nm. Specifically, affected by the alternating current electric field, the wavelength of the reflected light shifts toward the blue light wavelength, that is, a blue shift phenomenon occurs. FIG. 5 shows the relationships between central light reflection wavelengths and applied voltages of the first and the second embodiments. As the applied voltage gradually increases, the wavelength of the reflected light gradually changes toward the blue light wavelength. At an applied voltage of 60 V, the reflected light in the first embodiment shifts to 500 nm, and the reflected light in the second embodiment shifts to 440 nm. A response time for changing the light reflection wavelength through switching applied voltage is in microseconds. In other words, a response time of the polarizing grating of the present invention can reach a microsecond level.

In view of the foregoing, according to the cholesteric liquid crystal polarizing grating of the present invention, a reflective polarizing grating is formed by using the negative nematic liquid crystal molecules doped with the chiral molecules and the salt ions, in combination with the alignment layers having the periodically arranged alignment directions. When an alternating current electric field is applied, Helfrich deformation occurs in the negative cholesteric liquid crystal, so that a blue shift occurs in the reflection waveband, thereby achieving control of the reflection wavelength through an electric field change. Furthermore, even if the Helfrich deformation occurs in a middle portion of the liquid crystal layer, through an anchoring force provided by the alignment layer, the liquid crystal molecules adjacent to the alignment layer can still provide different pointing directions to reflect incident light, thereby maintaining a reflective polarizing function. In addition, a response time of the cholesteric liquid crystal polarizing grating of the present invention is in a microsecond level, thereby achieving fast dynamic adjustment. Thus, the cholesteric liquid crystal polarizing grating is applicable to devices that require real-time optical characteristic adjustments, such as a virtual reality or augmented reality device, a smart window, a safety label, or an optical filter. It is worthy to note that in the present invention, the manufacturing is significantly simplified, thereby reducing manufacturing costs and improving manufacturing efficiency.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:
1. A cholesteric liquid crystal polarizing grating, comprising:
    two substrates arranged opposite each other, wherein an interlayer space is formed between the two substrates, and the two substrates are electrically connected to a voltage source to form an electric field between the two substrates;

two alignment layers respectively located on inner surfaces of the two substrates facing the interlayer space, wherein alignment directions of the two alignment layers are periodically arranged, an alignment plane of each of the two alignment layers is divided into a plurality of rows parallel to each other, the alignment directions in a same row are the same, the alignment directions in adjacent rows rotate relative to each other, and the plurality of rows with the alignment directions rotated by 180 degrees defines a grating period; and a liquid crystal layer located in the interlayer space, wherein the liquid crystal layer includes negative nematic liquid crystal molecules, chiral molecules, and salt ions, and the negative nematic liquid crystal molecules adjacent to the two alignment layers are arranged following the alignment direction of each of the two alignment layers, forming a periodically arranged polarizing grating with the grating period.

2. The cholesteric liquid crystal polarizing grating as claimed in claim 1, wherein the grating period is between 200 nanometers and 40 micrometers.

3. The cholesteric liquid crystal polarizing grating as claimed in claim 1, wherein the salt ions include at least one selected from a group consisting of sodium chloride, calcium sulfate, sodium carbonate, sodium bicarbonate, potassium nitrate, tetrabutylammonium bromide, tetrabutylammonium hydrogen sulfate, tetrabutylammonium chloride, tetrabutylammonium hexafluorophosphate, and tetrabutylammonium tetrafluoroborate (TBATFB).

4. The cholesteric liquid crystal polarizing grating as claimed in claim 1, wherein a thickness of the liquid crystal layer is between 3 µm and 20 µm.

5. The cholesteric liquid crystal polarizing grating as claimed in claim 1, wherein a reflection waveband of the liquid crystal layer is between 400 nm and 700 nm.

6. The cholesteric liquid crystal polarizing grating as claimed in claim 1, wherein a pitch of the liquid crystal layer is between 300 nm and 500 nm.

7. The cholesteric liquid crystal polarizing grating as claimed in claim 1, wherein the alignment direction of each of the two alignment layers is oriented through exposure and/or a groove.

8. The cholesteric liquid crystal polarizing grating as claimed in claim 1, wherein a concentration of the salt ions is between 0.01% and 0.4%.

9. The cholesteric liquid crystal polarizing grating as claimed in claim 1, wherein each of the two substrates includes a conductive film disposed between the inner surface of each of the two substrates facing the interlayer space and the respective alignment layer.

10. The cholesteric liquid crystal polarizing grating as claimed in claim 1, wherein a birefringence range of the liquid crystal layer is greater than 0.1.

* * * * *